(12) United States Patent
FitzGerald

(10) Patent No.: US 7,735,108 B2
(45) Date of Patent: Jun. 8, 2010

(54) SYSTEM AND METHOD FOR CONTROLLING PUSH TO TALK INTERRUPTIONS WHILE WATCHING TELEVISION

(75) Inventor: Cary W. FitzGerald, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 1089 days.

(21) Appl. No.: 11/078,224

(22) Filed: Mar. 11, 2005

(65) Prior Publication Data

US 2006/0218597 A1    Sep. 28, 2006

(51) Int. Cl.
*H04N 7/173* (2006.01)
(52) U.S. Cl. ............... 725/106; 725/110; 725/141; 455/90.2; 379/218.01
(58) Field of Classification Search ............. 725/86–99, 725/106, 110, 141; 713/182; 379/218
See application file for complete search history.

(56) References Cited

U.S. PATENT DOCUMENTS

| 4,427,847 | A | 1/1984 | Hofmann et al. |
| 6,763,226 | B1 | 7/2004 | McZeal, Jr. |
| 2001/0038690 | A1* | 11/2001 | Palmer et al. .......... 379/218.01 |
| 2002/0053084 | A1* | 5/2002 | Escobar et al. ................. 725/47 |
| 2003/0023854 | A1* | 1/2003 | Novak et al. ................. 713/182 |
| 2005/0233776 | A1* | 10/2005 | Allen et al. ................... 455/567 |

OTHER PUBLICATIONS www.technewsworld.com, "Nokia Moves Forward with Push-to-Talk Plans," 3 pages total, Mar. 17, 2004, ECT News Network, www.technewsworld.com/story/33151/html.
Day et al., "A Model for Presence and Instant Messaging (RFC 2778)", Feb. 2000, 17 pgs.

* cited by examiner

*Primary Examiner*—Scott Beliveau
*Assistant Examiner*—Alan Luong
(74) *Attorney, Agent, or Firm*—Stolowitz Ford Cowger LLP

(57) ABSTRACT

The present invention relates generally to a system and method of managing a Push To Talk (PTT) conversation while the recipient is watching television. PTT messages may be conveyed by an initiator to a recipient through the use of a telephone connected to a network. The network is also connected to either a set top box (STB) or a Digital Video Recorder (DVR). Within the network resides a presence state machine, which determines if a PTT conversation may be initiated. Upon initiation of a PTT conversation the presence state machine may pause the television by a command to the STB or DVR. If the television has been paused, upon termination of the PTT conversation, the presence state machine instructs the STB or DVR to resume television display.

20 Claims, 4 Drawing Sheets

SYSTEM AND METHOD FOR CONTROLLING PUSH TO TALK INTERRUPTIONS WHILE WATCHING TELEVISION

FIELD OF THE INVENTION

The present invention relates generally to a system and method for utilizing Push to Talk technology when the receiver of a push to talk call is watching television.

BACKGROUND OF THE INVENTION

Push to Talk (PTT) refers to a technology provided by cell phone network providers and cell phone manufacturers. In use, a person wishing to place a PTT call presses a single button and is connected with their intended recipient or group of recipients. Conversation between the initiator of the PTT call and the recipient(s) is akin to what is commonly referred to as "walkie-talkie". In such conversations, only one person may speak at a time, once that person is finished speaking, another may take their turn. PTT is typically used for brief communications, but it can be effective in many situations and has become quite popular among many cell phone users. A parallel in Internet communication would be instant messaging. As with instant messaging, PTT is not efficient for lengthy or complex conversations, but does provide for rapid contact. Just like a walkie-talkie.

Upon receiving a request for a PTT conversation, the recipient must answer the telephone to receive the PTT conversation. Should a recipient of a PTT request be watching television when the request is received, the recipient may desire to have their television viewing automatically paused while accepting the request, or to simply ignore the request. The present invention provides both of these options to the recipient.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF THE INVENTION

PTT technology is beginning to replace the traditional use of a walkie-talkie, particularly in maintenance and construction environments. It is a relatively inexpensive form of communication, and utilizes a light compact device, a cell phone. Push to talk is also being embraced by other groups of individuals as it provides a quick and easy method of delivering a short message by pushing one button and sending a quick message, for example, "I am on my way home". As PTT features are being added to cellular networks and more and more phones become PTT enabled, many cell phone users will have the capability of using PTT. A typical PTT application allows a user to send a call to an individual selected from a list, or to a group of people simultaneously. An example of the simultaneous case would be "Emergency meeting at 12:00, lunchroom". A user can also determine if another user is accepting PTT calls before placing a call.

The present invention deals with PTT conversations with a recipient (let us call him Bob) who is watching television. In one aspect, should Bob agree to accept PTT messages while watching television, the receipt of a message causes the television to be paused. In another aspect, Bob may not wish for the television to be paused during a PTT conversation. To avoid unwanted messages, Bob could alternatively deny PTT messages while viewing television.

Figure 1:
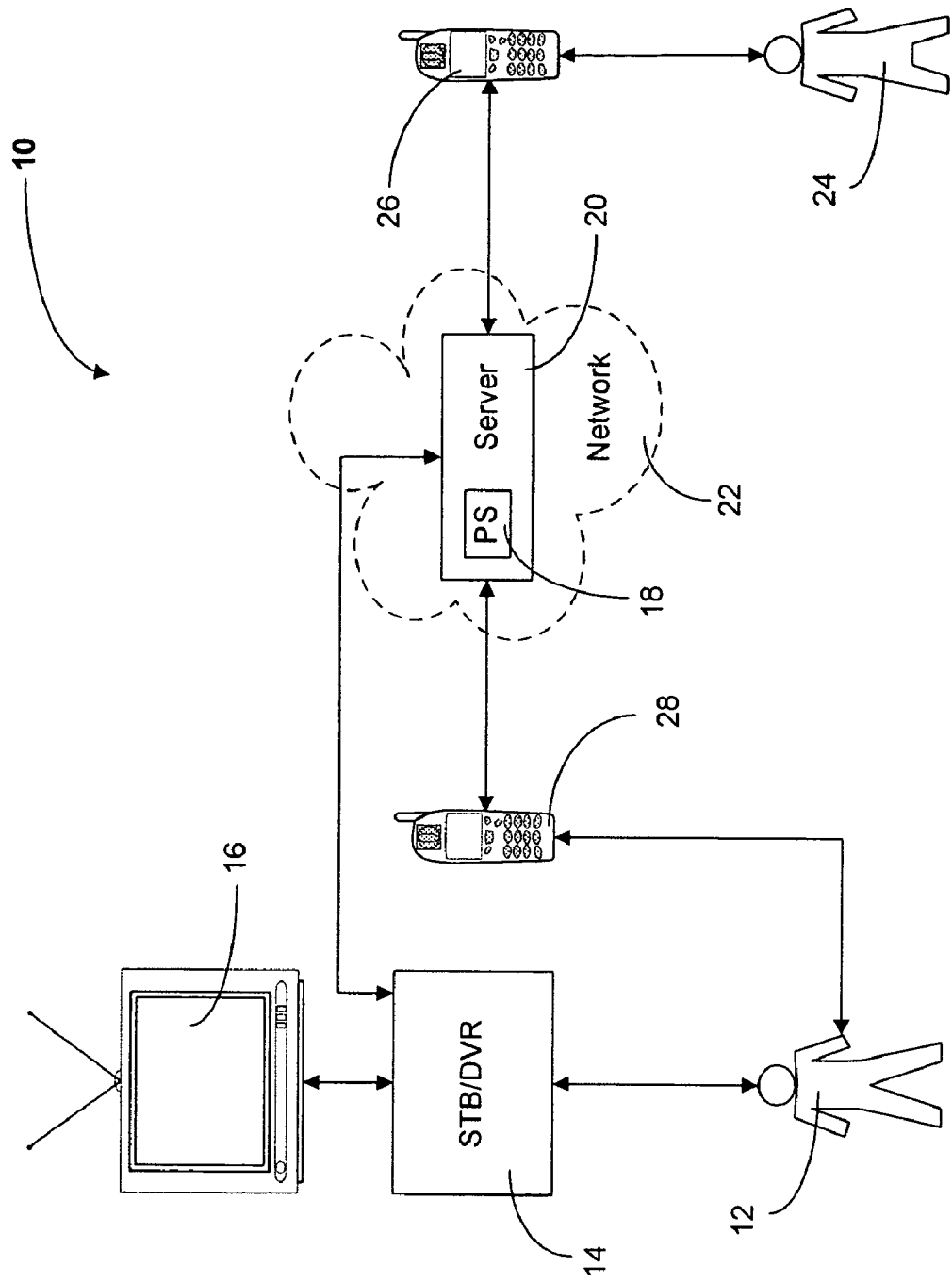
FIG. 1 is a block diagram of a system utilizing the present invention.

To aid the reader in understanding the invention, we refer first to FIG. 1. FIG. 1 is a block diagram of a system utilizing one embodiment of the present invention and is shown generally as 10. In use, Bob (shown as 12 in all Figures) would communicate with a device such as a Set Top Box or Digital Video Recorder (STB/DVR) 14 connected to a television 16. Television 16 may be any device capable of receiving a television signal, for example a wireless handheld television, a standalone television set or a personal computer. Bob would typically communicate with STB/DVR 14 via a handheld control device, a personal computing device or directly through controls on STB/DVR 14. Once communication has been established STB/DVR 14 informs presence state module (PS) 18 resident in server 20 that Bob is viewing television. Communication with PS 18 is conducted via network 22. PS 18 although shown as being resident within server 20, may alternatively be resident in STB/DVR 14 or a device controlling STB/DVR 14. Network 22 may be any network designed to handle content to be delivered to television 16 as well as PTT messaging. Any number of communication protocols may be utilized for a PTT connection, examples include but are not limited to; Hypertext Transfer Protocol (HTTP), Session Initiation Protocol (SIP) and other protocols published as a Request For Comments (RFC) by the International Engineering Task Force (IETF). For example, in the case of HTTP, the POST message may be used to establish a connection. In the case of SIP, INFO/PUBLISH or SUBSCRIBE/NOTIFY messages may be used to establish a connection.

In one embodiment, if Bob wishes to receive PTT messages, Bob utilizes recipient telephone 28 or STB/DVR 14 to inform PS 18 that he is willing to receive phone calls. Although PS 18 is aware that STB/DVR 14 is on and thus television 16 is being viewed, Bob may not wish to receive PTT communications. For example, should others be viewing television 16 without Bob present, attempts at a PTT conversation will be denied, unless Bob has indicated via telephone 28 or STB/DVR 18 an availability to participate in a PTT conversation. As channels are changed on television 16, STB/DVR 14 communicates to PS 18 the channel currently being viewed. Further, when STB/DVR 14 is turned off, PS 18 is informed that television 16 is no longer being viewed.

In sending a PTT message to Bob an initiator 24 (let us call her Alice) utilizes a telephone 26 which connects with Bob's recipient telephone 28. Telephones 26 and 28 may be any type of device capable of transmitting and receiving a PTT message over network 22. Such as a standard desktop phone, a personal computer (hand held or desktop) with telephony capability or a cellular phone. If Bob has enabled PTT communications and is willing to accept a PTT message from Alice, a PTT message sent by Alice would be available on Bob's recipient phone 28. Should a PTT message be accepted by Bob, PS 18 may pause the viewing of television 16 via a command to STB/DVR 14.

Acceptance of a request to initiate a PTT communication may be dependent upon preconfigured or programmable whitelists or blacklists of initiators 24 within STB/DVR 14 or PS 18. Those on the blacklist will be ignored while those on the whitelist will be accepted. Such lists may be created and modified by Bob. In receiving a PTT communication, the inventor proposes two scenarios:

1. The PTT communication from Alice is routed through PS 18 which determines whether to forward the request for PTT communication to Bob's recipient telephone 28 or not. If Bob is viewing television 16 and does not wish to be interrupted, then PS 18 will reject the request.
2. The PTT call is routed to Bob's recipient telephone 28. Telephone 28 communicates with PS 18 and determines if the request should be honoured or rejected.

What is being viewed on television 16 may also affect whether PTT messages will be accepted. For example, in one embodiment PS 18 may maintain a database of programming content and based upon the time and the channel being watched can determine if a commercial is being shown. If a commercial is being shown, PS 18 may agree to accept a PTT request. In other embodiments, additional factors such as the time of day may be utilized to determine if a PTT request should be honoured.

In one embodiment, Bob may also indicate to PS 18 that PTT communications will only be accepted during certain broadcasts. For example Bob may not want to be interrupted with a PTT message while watching a favourite movie, but may be willing to view messages while watching the news.

Figure 2:
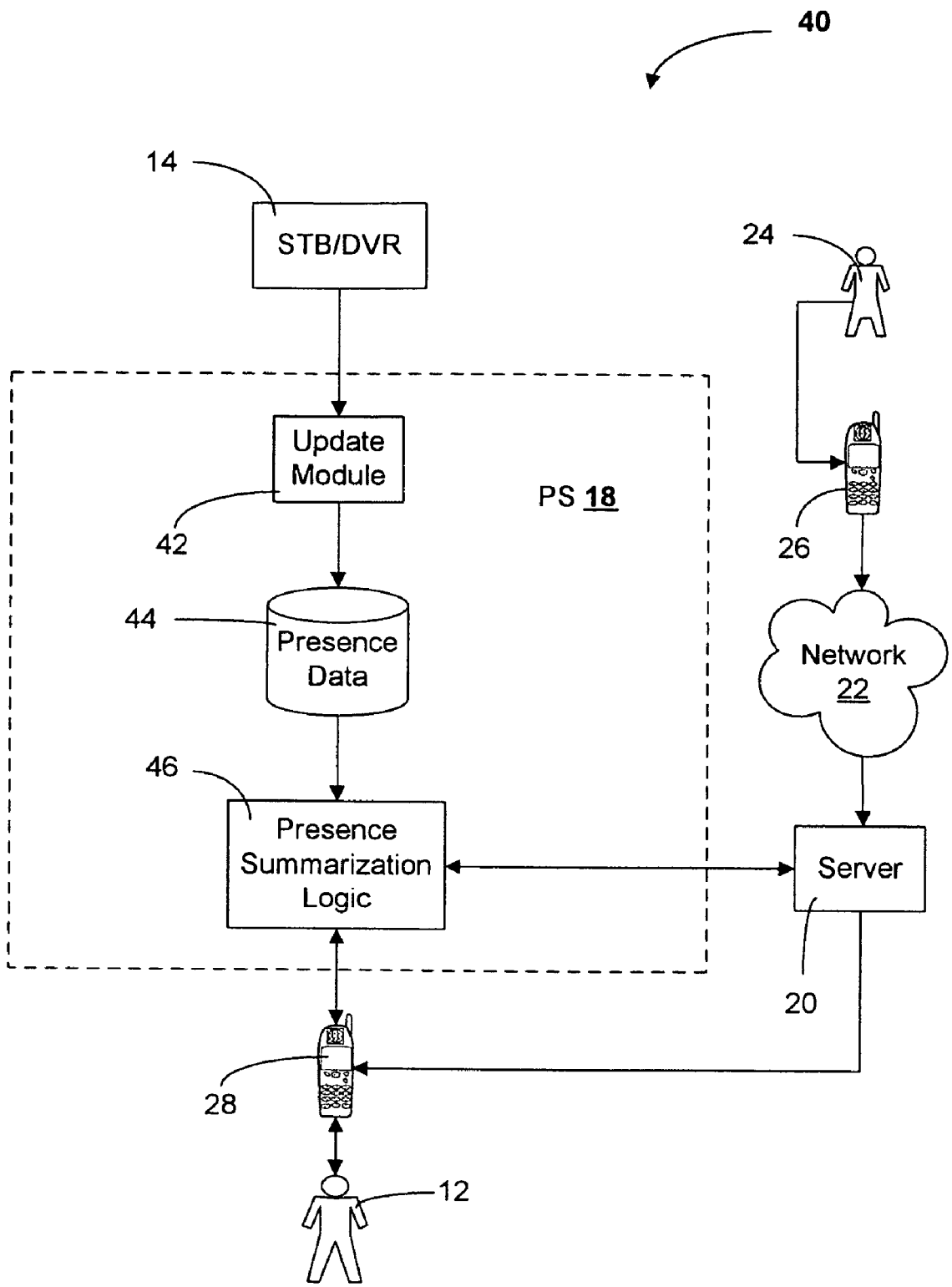
FIG. 2 is a block diagram illustrating the components of a presence state module.

Referring now to FIG. 2, a block diagram illustrating the components of a presence state module is shown generally as system 40. The structure of system 40 is based upon Request for Comments (RFC) number 2778 published by the Internet Engineering Task Force (IETF) in February, 2000. This RFC is commonly referred to as RFC2778. RFC2778 is titled *A Model for Presence and Instant Messaging*. RFC2778 provides for a "presence service", one or more "presentities" and one or more "watchers". In the embodiment of the present invention as shown in FIG. 2, the presence service is presence state module 18, the presentity is an STB/DVR 14 and the watchers are recipient telephones 28. For the purpose of simplicity a single STB/DVR 14, and recipient telephone 28 are illustrated. In practice a plurality of STB/DVRs 14 and recipient telephones 28 may make use of presence state module 18.

In use an STB/DVR 14 would provide presence state data to presence state module 18. Presence state data from an STB/DVR 14 is received by an update module 42. Update module 42 then stores this data in a database (or data store) such as presence data 42. By way of example, presence data 42 would comprise:

a) the current channel being viewed;
b) an indicator as to if Bob wishes to receive a PTT communication;
c) an indicator as to if Bob wishes to have television 16 paused during a PTT communication;
d) channels for which Bob may choose to be interrupted to receive a PTT communication, or alternatively channels which Bob does not wish to be interrupted to receive a PTT communication;
e) a whitelist of initiators that may be accepted for a PTT communication; and
f) a blacklist of initiators that will not be accepted for a PTT communication.

It is not the intent of the inventor to restrict the source of presence data to STB/DVR 14. For example, a telephone or computing device could be in communication with update module 42 to provide presence data.

A presence summarization logic module 46 accesses the data in presence data 44 and based upon specific rules, communicates with a recipient telephone 28. Each recipient telephone 28 is operatively connected to a unique presence summarization logic module 46. In one example of how a presence summarization logic module 46 may function, consider the following scenario. Bob provides STB/DVR 14 with a set of channels that Bob will allow to be interrupted to accept a PTT request. This information is sent by STB/DVR 14 to update module 42 and stored in presence data 44. If Bob has STB/DVR 14 on and is watching television, STB/DVR 14 communicates this to update module 42 and presence data 44 is updated to indicate that Bob has STB/DVR 14 on and is watching a specific channel.

2. The PTT call is routed to Bob's recipient telephone 28. Telephone 28 communicates with PS 18 and determines if the request should be honoured or rejected.

Should a request for a PTT conversation come to PS 18 a presence summarization module 46 will examine presence data 44 and determine if the request for a PTT conversation will be passed to Bob's recipient phone 28. As Bob changes channels, presence data 44 is updated to aid in determining if Bob will accept a request for a PTT conversation.

Figure 3:
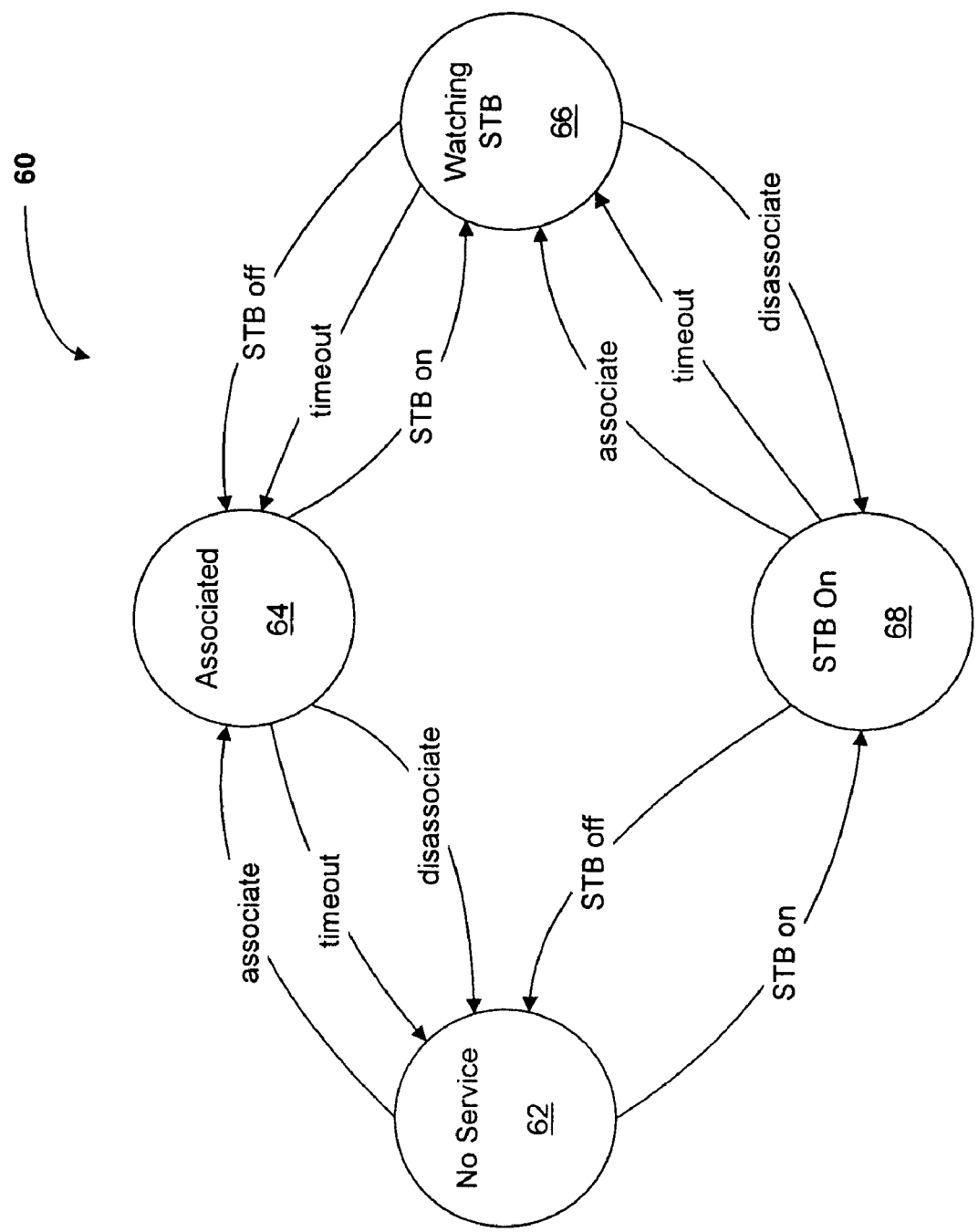
FIG. 3 is a state diagram of a presence state module communicating with a Set Top Box.

Referring next to FIG. 3 a state diagram of a presence state module communicating with a set top box is shown generally as 60.

The state diagram of FIG. 3 illustrates an implementation of PS 18 where STV/DVR 14 consists of a set top box. In FIG. 3, the label "associate" indicates that STB/DVR 14 is available to receive PTT messages, should Bob indicate a desire to receive them. The label "disassociate" means Bob does not wish to receive PTT messages.

State diagram 60 comprises four states: no service state 62, associated state 64, watching STB state 66 and STB on state 68. In no service state 62, Bob has STB/DVR 14 turned off or has chosen to disassociate himself from any PTT messages. Should Bob choose to receive PTT messages, a transition is made to associated state 64. In associated state 64, STB/DVR 14 is on and Bob has indicated via recipient telephone 26 that PTT communications are to be accepted. A transition is then made to watching STB state 66 wherein Bob may receive PTT messages. While in watching STB state 66 if STB/DVR 14 is turned off, a transition is made to associated state 64 and then to no service state 62.

Alternatively, turning on STB/DVR 14 may automatically enable reception of PTT messages. In this alternative, Bob is not required to request the receipt of PTT message, as a transition is made from no service state 62 to STB on state 68 and then to watching STB state 66. While in watching STB state 66 if Bob decides to not receive PTT messages, a transition is made from watching STB state 66 to STB on state 68. While in STB on state 68 if STB/DVR 14 is turned off, a transition is made to No Service state 62.

Associated state 64, watching STB state 66 and STB on state 68 may timeout and return to no service state 62, associated state 64 or watching STB state 66 respectively. A timeout may occur when the power to STB/DVR 14 fails, the battery or the power is lost to Bob's recipient telephone 26 or network 20 is interrupted.

Figure 4:
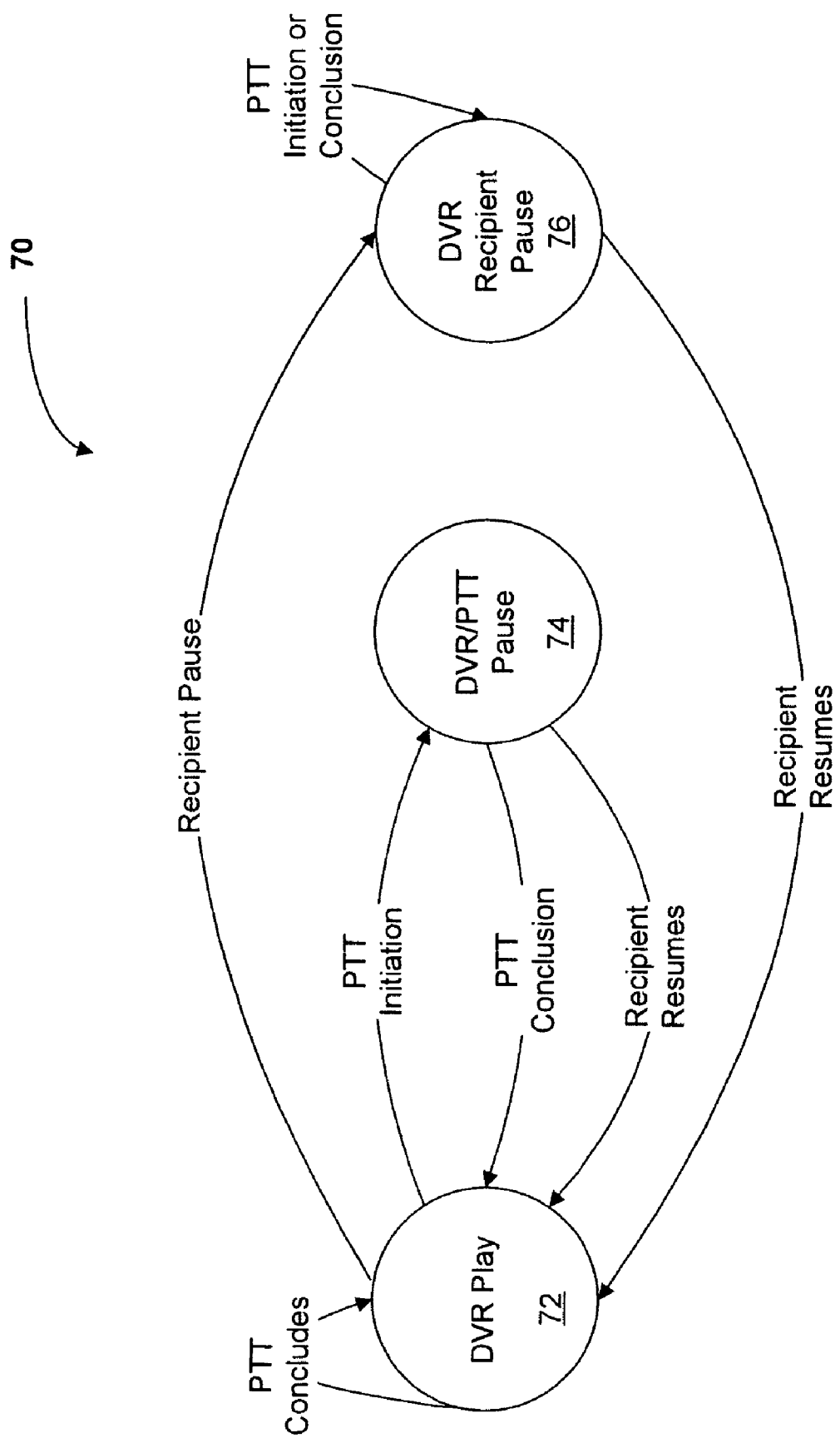
FIG. 4 is a state diagram of presence state module communicating with a Digital Video recorder.

Referring now to FIG. 4 a state diagram of presence state module communicating with a Digital Video Recorder is shown generally as 70.

In the state machine of FIG. 4, STB/DVR 14 consists of a DVR. State diagram 70 illustrates three states; DVR play state 72, DVR/PTT pause state 74 and DVR recipient pause state 76. In DVR play state 72, STB/DVR 14 is playing or recording material from television 16. During DVR play state 72 should a PTT conversation be accepted from Alice, a transition is made to DVR/PTT pause state 74 where Bob may conduct a PTT conversation. Upon completion of the PTT conversation, a transition is made to DVR play state 72. Alternatively, while in DVR/PTT pause state, Bob may decide not to participate in or continue the PTT conversation and a transition is made to DVR Play state 72. While in DVR play state 72, if the PTT conversation concludes, no transition to another state is made.

While in DVR play state 72 should Bob pause STB/DVR 14 a transition is made to DVR recipient pause state 76. While in state 76 the initiation or conclusion of any PTT conversation does not change the state. While in state 76 Bob may resume the playing of STB/DVR 14 in which case a transition is made to DVR state 72.

With regard to another feature of the present invention, it may be utilized to create ad-hoc communities. Information collected by PS 18 could be used to create communities of interest, which could be used for PTT messaging. For example when viewing a specific television channel a list of current viewers with access to PTT would be available allowing PTT conversation among interested parties.

Another aspect of the present invention would be to allow Bob to initiate a PTT conversation while watching television 16. In this case the viewing of television 16 may be paused once the PTT communication is established and restarted once the PTT conversation has terminated.

Although the present invention has been described in parts as being a software based invention, it is the intent of the inventor to include computer readable forms of the invention. Computer readable forms meaning any stored format that may be read by a computing device.

Although the invention has been described with reference to certain specific embodiments, various modifications thereof will be apparent to those skilled in the art without departing from the spirit and scope of the invention as outlined in the claims appended hereto.

I claim:

1. A presence state module for enabling a push to talk (PTT) communication between an initiator and a recipient of said PTT communication, comprising:
   a first module operatively connected to a set top box or a digital video recorder, wherein said first module is configured to collect recipient presence data;
   a data storage medium operatively connected to said first module, wherein said data storage medium is configured to store received presence data from said first module, wherein said presence data identifies a current television program being displayed, and wherein said presence data further identifies a first television program designated to be interrupted for said PTT communication and a second television program designated to not to be interrupted for said PTT communication; and
   a second module operatively connected to said data storage medium, wherein said second module is configured to filter said PTT communication to said recipient based on said presence data, wherein said PTT communication is allowed to interrupt said current television program when said first television program is being broadcast, and wherein said PTT communication is not allowed to interrupt said current television program when said second television program is being broadcast.

2. The presence state module of claim 1 wherein said current television program is interrupted by pausing said current television program.

3. The presence state module of claim 2 wherein said current television program is recorded during said PTT communication.

4. The presence state module of claim 1 wherein said first television program comprises television commercials, and wherein said second television program comprises said current television program.

5. The presence state module of claim 1 wherein said presence data further identifies either or both of a whitelist or a blacklist to aid in determining whether a request for said PTT communication will be allowed to interrupt said current television program depending if the initiator is on the whitelist or the blacklist.

6. An apparatus, comprising:
   means for collecting recipient presence data through a module operatively connected to a set top box or a digital video recorder, wherein said presence data identifies a current television program being displayed, and wherein said presence data further identifies a list of television programs during which said current television program may not be interrupted for a push to talk (PTT) communication;
   means for storing said presence data on a computer readable medium, wherein said medium is operatively connected to said module;
   means for filtering PTT communication requests based, at least in part, on said stored presence data;
   means for displaying a filtered PTT request when said current television program is not included in said list of television programs; and
   means for automatically refusing said PTT communication when said current television program is included in said list of television programs.

7. The apparatus of claim 6 wherein said PTT communication is automatically accepted when a television commercial is being displayed during said current television program.

8. The apparatus of claim 6 wherein said PTT communication is automatically accepted when said current television program is not included in said list of television programs, and wherein said current television program is temporarily interrupted during said PTT communication.

9. A method comprising:
   receiving presence data identifying a current television program being displayed, wherein said presence data further identifies a list of television programs designated as not to be interrupted by a push to talk (PTT)communication;
   storing said presence data on a computer readable medium;
   receiving a PTT;
   filtering said PTT request based, at least in part, on said presence data;
   establishing said PTT communication based on said filtered PTT request when said current television program is not included in said list of television programs, wherein said current television program is temporarily interrupted during said PTT communication; and
   automatically rejecting said PTT communication based on said filtered PTT request when said current television program is included in said list of television programs.

10. The method of claim 9 wherein temporarily interrupting said current television program comprises pausing said current television program.

11. The method of claim 9 wherein said PTT communication is only allowed to interrupt said current television program during a commercial break.

12. The method of claim 9 wherein said presence data further identifies a blacklist to aid in determining whether said current television program is to be interrupted, and wherein said PTT communication, when associated with a PTT initiator included in said blacklist, is automatically rejected.

13. A computer-readable medium having instructions stored thereon, wherein execution of said instructions by at least one device causes said at least one device to:
receive presence data, wherein said presence data indicates a current television program being displayed, and wherein said presence data further indicates a list of television programs that may not be interrupted for a push to talk (PTT) communication;
store said presence data;
receive a PTT request from an initiator;
filter said PTT request based, at least in part, on said presence data;
establish said PTT communication in response to said filtered PTT request when said current television program is not included in said list of television programs, wherein said current television program is temporarily interrupted during said PTT communication; and
automatically reject said PTT communication when said current television program is included in said list of television programs.

14. The computer-readable medium according to claim 13 wherein said presence data further indicates a preference to have the current television program paused during said PTT communication.

15. The computer-readable medium according to claim 13 wherein said presence data further identifies a group of current viewers of said current television program.

16. The computer-readable medium according to claim 15 wherein PTT communications from one or more of said group of current viewers are allowed to interrupt said current television program.

17. The computer-readable medium according to claim 13 wherein said PTT communication is automatically established when said PTT request is received during a commercial break of said current television program.

18. The presence state module of claim 1 wherein said presence data further identifies hours of a day that said PTT communication may or may not interrupt said current television program.

19. The apparatus of claim 6 wherein said presence data further identifies channels and hours of a day that said PTT communication may or may not interrupt said current television program.

20. The method of claim 9 wherein said presence data further identifies hours of a day and days in a week that said PTT communication may or may not interrupt said current television program.

* * * * *

UNITED STATES PATENT AND TRADEMARK OFFICE
CERTIFICATE OF CORRECTION

| | | |
|---|---|---|
| PATENT NO. | : 7,735,108 B2 | |
| APPLICATION NO. | : 11/078224 | |
| DATED | : June 8, 2010 | |
| INVENTOR(S) | : Cary W. FitzGerald | |

It is certified that error appears in the above-identified patent and that said Letters Patent is hereby corrected as shown below:

On column 6, line 42, CLAIM 9, after "A" delete "method" and insert -- method, --.

On column 8, line 49, CLAIM 9, after "PTT" insert -- request --.

Signed and Sealed this
First Day of May, 2012

David J. Kappos
*Director of the United States Patent and Trademark Office*